United States Patent Office

3,489,735
Patented Jan. 13, 1970

1

3,489,735
COPOLYMERS OF 4-METHYL PENTENE-1 WITH LINEAR 1-OLEFINES
Keith Jasper Clark and Michael E. B. Jones, Welwyn Garden City, England, assignors to Imperial Chemical Industries Limited, London, England, a corporation of Great Britain
No Drawing. Filed Apr. 15, 1964, Ser. No. 360,079
The portion of the term of the patent subsequent to July 25, 1984, has been disclaimed
Claims priority, application Great Britain, Apr. 18, 1963, 15,374/63; May 15, 1963, 19,330/63; Aug. 13, 1963, 31,932/63
Int. Cl. C08f *15/04*
U.S. Cl. 260—88.2
22 Claims

ABSTRACT OF THE DISCLOSURE

Solid transparent copolymers of 4-methyl pentene-1 with from about 0.5 to about 30% by weight of a linear 1-olefine having from 5 to 18 carbon atoms. The copolymers can be melt-shaped to give articles of high clarity and low haze, even in thick section.

---

This invention relates to new copolymers and articles.

In our copending applications Nos. 22,695/61 and 43,034/61 we have disclosed our discovery of transparent polymers of 4-methyl pentene-1 and of transparent articles made from this polymer. We have now found that certain copolymers of 4-methyl pentene-1 with certain other α-olefines can also be transparent under suitable conditions, and that such copolymers also have certain advantages over homopolymers of 4-methyl pentene-1.

According to the present invention we provide transparent copolymers of 4-methyl pentene-1 with minor amounts of a linear 1-olefine having from 5 to 18 carbon atoms, and transparent articles made therefrom by melt-shaping processes.

We further provide a process for the manufacture of transparent copolymers of 4-methyl pentene-1 with minor amounts of a linear 1-olefine having from 5 to 18 carbon atoms wherein 4-methyl pentene-1 and a linear 1-olefine having from 5 to 18 carbon atoms are polymerised in the presence of a stereospecific catalyst (as hereinafter defined) and the copolymer obtained is de-ashed using dry reagents to reduce its ash content to less than 0.1% by weight and preferably to 0.02% by weight or less. It is a particular feature of the present invention to provide transparent copolymers of 4-methyl pentene-1 containing between 0.5 and 30% by weight of monomer units of a linear 1-olefine having from 5 to 18 carbon atoms. Particularly useful linear 1-olefines are pentene-1 and hexene-1 copolymerised in amounts of between 0.5 and 20%. It is possible to use mixtures of linear 1-olefines, which may contain two, three, four or even more linear 1-olefines as well as a small quantity of other olefins which may or may not copolymerise.

In the term "copolymer" we include the products of both random and sequential polymerisation.

In this specification, the word "transparent" when used of polymers, shall be taken to mean "capable of being transformed by a melt-shaping process into articles of which an ⅛" thick section has a degree of clarity of at least Grade I (as hereinafter defined) and a degree of haze of Group 1 (as hereinafter defined)"; when used of articles, the word "transparent" shall be taken to mean "having in ⅛" thick section a degree of clarity of at least Grade I (as hereinafter defined) and a degree of haze of Group 1 (as hereinafter defined)."

Overall impressions of transparency depend on two factors: clarity and haze. We define clarity as the ability to transmit light from distant objects without scattering. It is reduced by forward scattering at small angles particularly within 0.5° of the incident beam. When the clarity is perfect, the sharpness of outline and resolution of detail of distant objects viewed through parallel sided specimens are unaffected. For measuring clarity we use the following method.

A sample is prepared of ⅛" thickness. To eradicate scattering at surface scratches or imperfections, thin glass plates are stuck to the surfaces of the sample with olive oil (which has a refractive index close to that of the copolymers of our invention). Through this sample, using a fixed observation distance of 1.5 metres, a series of charts each consisting of equal width black and white lines arranged vertically, horizontally and diagonally are used. The line widths in the series are 1.0, 0.6, 0.24 and 0.175 millimetre, corresponding to angular resolutions of 0.038, 0.039, 0.0092 and 0.0067° (semi-angle). Tests are carried out in a dark room. The charts are illuminated at the most suitable brightness which is found to be about 500 candles per square metre. The sample is held close to one eye and the chart with the smallest spacing that can be resolved is noted and compared with the finest spacing that can be resolved in the absence of the sample. The results can then be expressed in terms of the loss of angular resolution due to the introduction of the sample between the eye and the charts and are independent of the limiting resolution of the eye of the observer.

For the purposes of this invention we distinguish four degrees of clarity. The clarity of mouldings from any particular sample of polymer depends not only on the conditions employed in preparing the polymer sample, but also on the conditions employed in making the mouldings. The four degrees are Grade I: Loss of 0.0200° (semi-angle) resolution or less
Grade II: Loss of 0.0100° (semi-angle) resolution or less
Grade III: Loss of 0.0025° (semi-angle) resolution or less
Grade IV: No loss in visual resolution.

We define haze as the degree of scattering at high angles to the transmitted beam. Haze causes turbidity and hence reduction in contrast. To measure it, the intensity of light scattered from semi-angles of 2½ to 90° to the incident transmitted beam is integrated and compared with the total transmittance (0° to 90°) of the sample. We employ the method described in the American Society for Testing Materials publications "ASTM Standards on Plastic," 11th edition, 1959, as method No. 1003-59T.

In the polymers and articles of our invention we distinguish four degrees of haze.

| | Percent haze |
|---|---|
| Group 1 | 0–45 |
| Group 2 | 0–30 |
| Group 3 | 0–15 |
| Group 4 | 0–5 |

The haze in a moulding, like the clarity, depends on polymer quality and to a certain extent moulding conditions.

To prepare transparent polymer having the highest possible clarity and the lowest possible haze by the process of our invention, two things are essential; that a high proportion of the catalyst residues should be removed from the polymer produced, and that the polymer should not be allowed to come into contact with water until the catalyst removal process is at an end. For convenience in manipulating the polymer it is preferred that it should be produced in the form of an easily handleable slurry rather than a sticky gel. The important feature of an easily handleable slurry is that it is separable, that is, one in which the liquid can be removed from the solid phase by mechanical means. Separability is important because in the de-ashing process, the catalyst residues are made to dissolve in the liquid phase; if this cannot be separated, catalyst residues remain in the polymer and material of the highest transparency is not obtained (of course, if the slurry is separable, the original liquid phase may be removed and the polymer can be re-slurried and de-ashing carried out in a different medium from that in which polymerisation took place). Methods which may be used to separate the two phases in suitable cases include centrifuging, filtration, washing with other liquids, decantation, or any combination of these processes. Where a slurry is thick and difficult to separate because it contains too high a proportion of suspended solids, separation is made much easier by dilution. It is often useful to dilute with polar liquids, e.g. methyl alcohol.

The following are the principal factors which affect the separability of the copolymer slurry:

(1) The temperature of polymerisation and of separation
(2) The nature of the catalyst
(3) The nature of the diluent
(4) The composition of the copolymer.

Each of these conditions must generally be adjusted to obtain a separable slurry. Increase in temperature of polymerisation increases the proportion of atactic polymer formed, and also gives rise to isotactic polymer of lower molecular weight, which dissolves more readily at all temperatures and particularly at the higher temperature at which it is formed. Provided stereospecific catalysts are used, the highest temperature at which a separable slurry can be obtained is that at which the isotactic polymer begins to be swollen by the diluent, or to dissolve in it to an appreciable extent.

Subject to the desirability of producing a separable slurry, one usually wants to polymerise at as high a temperature as possible, because the rate of polymerisation is then faster. The higher the temperature of polymerisation, the lower the molecular weight of polymer produced; to obtain polymer grades of higher molecular weight it may therefore be necessary to use temperatures below those which give the best rate consistent with separability. The molecular weight of the polymer formed may also be reduced, if desired, by the addition of certain polymerisation modifiers, notably hydrogen, to the reaction mixture.

There is no possibility of obtaining a separable slurry at all unless a stereospecific catalyst is employed. By a "stereospecific catalyst" we means one which under the conditions used in polymerisation in this invention will polymerise propylene to polymer which is at least 70% insoluble in boiling heptane. It is well known that mixtures of transition metal compounds and organo-metallic compounds are in general effective for the polymerisation of α-olefines. However, unless the catalyst used in our invention has a stereoregular action which gives rise to a sufficiently high proportion of isotactic polymer it will tend to produce intractable gels instead of separable slurries. Generally, the more stereoregular the action of the catalyst, the higher the maximum temperature which may be used in polymerisation. It will not generally be possible to predict what catalysts are stereospecific and under what conditions; trial experiments must be made with each catalyst which it is proposed to use. In our preferred process for polymerisation below we describe two particularly useful catalysts, but our invention is not limited to the use of these.

The nature of the diluent affects the temperature at which the isotactic polymer will begin to be swollen by the diluent or to dissolve in it appreciably. It will generally be possible to carry out the process of our invention between 10 and 80° C. Suitable diluents include petroleum ether (B.P. 60 to 80°), a petrol fraction boiling between 180 and 220° C., toluene, chloro-benzene and 4-methyl pentene-1 itself. Each of these diluents will give, in suitable circumstances, separable slurries.

The copolymers of this invention are intrinsically more soluble than 4-methyl pentene-1 homopolymer, solubility increasing with decreasing 4-methyl pentene-1 content. Thus, for example, homopolymers of pentene-1 and hexene-1 are soluble in hydrocarbon diluents at ordinary temperatures e.g. about 50° C. The lower the content of 4-methyl pentene-1 in the copolymer being made, therefore, the more care will generally be necessary to obtain a separable slurry.

A slurry which contains dissolved in the diluent a concentration of not more than 10% of the polymer content is readily separable, and it is slurries of this kind that we prefer to use in our invention. Such slurries may be obtained by our preferred method of polymerisation, that is, by polymerising at about 30° or below, using a diluent which may be a high boiling petrol fraction, petroleum ether of boiling point 60–80° C., or 4-methyl pentene-1 itself and using as catalyst an aluminium dialkyl-chloride in combination with either the crystalline material obtained by reacting titanium tetrachloride with aluminium at a temperature below 220° C. as in British Patent No. 877,050 or a material obtained by reacting titanium tetrachloride with aluminium sesquichloride in a hydrocarbon medium with stirring in an inert atmosphere at about 0° C. preferably by adding a solution of the sesquichloride drop by drop to a solution of the TiCl₄.

Polymerisation is carried out in the absence of air and water, or in the presence of only limited amounts of these, since both air and water deactivate the catalyst. Nitrogen is often used to purge the apparatus beforehand. Many different techniques are available for copolymerising the monomers. 4-methyl pentene-1 boils at 54° C., pentene-1 at 30° C., hexene-1 at 63° C. and heptene-1 at 93° C.; the higher linear 1-olefines all boil above 100° C. Superatmospheric pressure may be used if desired. Copolymers may be made in a random manner by passing both monomers into the reaction vessel at predetermined rates so that the concentration of both monomers in the reaction mixture is constant throughout. Similar copolymers may also be made by beginning polymerisation with a large amount of 4-methyl pentene-1 (conveniently in the absence of any inert diluent medium) and passing in the other monomer at a fixed rate throughout. In this way the copolymer initially formed may be slightly richer in 4-methyl pentene-1 than that formed later, but the effect is not large. Copolymers may be made simply by polymerising mixtures of the two monomers; in such cases the composition of the product will depend on the relative polymerisation rates of the two monomers and the polymerisation time. Sequential co-polymerisation may be carried out by polymerising 4-methyl pentene-1 while passing in the second monomer for one or more controlled periods, such periods being at spaced intervals. This procedure may give rise to a proportion of polymer molecules containing one or more "blocks" of 4-methyl pentene-1 homopolymer joined to one or more blocks of copolymer of 4-methyl pentene-1 with the linear 1-olefine. Finally, sequential copolymerisation may be carried out by polymerising successively pure monomers; this may be done by polymerising one monomer for a period, then removing all unreacted monomer from the polymerisation system (for example, by pumping it off under low pressure) and adding and polymerising the second monomer and, if desired, repeating the process. This procedure may give rise to polymer molecules contain successive blocks of homopolymer of the two monomers.

De-ashing of the polymer slurry obtained by polymerisation is carried out using dry reagents; if reagents containing water or aqueous extraction processes are used the polymer obtained shows an undesirable "blue haze" and may not be of the highest transparency. De-ashing may be carried out in two main ways. One is by adding a small quantity of reagent to the slurry, digesting for a period at a moderate temperature, e.g. between 20° and 40°, followed by filtration and washing with more de-ashing reagent or hydrocarbon or mixtures of the two. The other is first to separate all or most of the polymerisation diluent from the polymer produced and to re-slurry the polymer one or more times in de-ashing reagent. In the first process the most suitable types of de-ashing reagents are the hydrocarbon-miscible alcohols such as isopropanol butanol, or the higher alcohols such as nonanol and isodecanol and higher acids and amines such as n-nonoic acid and 3,5,5-trimethylhexylamine. Particularly effective are mixtures of alcohols with complex-forming carbonyl compounds, such as isopropanol mixed with acetylacetone. In the second process it is of particular advantage to use the lower alcohols, such as methanol and ethanol, because of their cheapness. Suitable de-ashing procedures are further described in British Patent No. 942,297.

Finally the de-ashing reagent or wash liquid may be separated from the polymer by filtration or centrifuging followed by evaporative methods if it is of low boiling point, e.g. if it is methanol or a low boiling petroleum ether. If it is not low boiling, e.g. if it is a hydrocarbon liquid of high boiling point, it may be separated by filtration or centrifuging or washed from the polymer by a low boiling liquid which in its turn may be separated by an evaporative method. An alternative method for removing quantities of the wash liquid after filtration or centrifuging is by steam distillation followed by drying the polymer. Final removal of a low boiling wash liquid may be satisfactorily accomplished by such methods as passing a gas (preferably for safety an inert gas such as nitrogen) through a cake of polymer particles on a filter, a centrifuge or a fluidised bed, and in an evaporative extruder.

Manufacture of the articles of our invention using our polymers may be carried out by a variety of known techniques, e.g. extrusion, injection moulding, compression moulding, powder coating, blow moulding and methods such as that of British specification No. 821,634.

The copolymers of our invention have low softening points than homopolymers of 4-methyl pentene-1, which is advantageous in enabling them to be worked and moulded at lower temperatures. They may also show other advantages, for example, the optical properties of copolymers containing between 0.5 and 30% by weight of linear α-olefines are in many cases better than those of the pure homopolymer. The transparency of the copolymers of the invention is less dependent on moulding condition than is the case with the homopolymer; this is illustrated by Tables 1–4 of the examples. The flexibility and toughness of the copolymers increases with increasing content of linear 1-olefine and certain of the copolymers of this invention are sufficiently flexible for use in the manufacture of transparent "squeeze bottles." Particularly useful articles according to our invention are flexible packaging containers (for example squeeze bottles made by blow-moulding) made from polymers according to our invention containing between 8 and 30% by weight of monomer units of a linear 1-olefine having from 5 to 18 carbon atoms.

The following examples illustrate our invention but do not limit it in any way.

The $TiCl_3$ catalyst component used below was obtained by reaction of $TiCl_4$ and aluminium ethyl sesquichloride in a hydrocarbon fraction (boiling range 170 to 200° C.). A solution of the sesquichloride was added drop by drop, with stirring, to a solution of $TiCl_4$ using a molar ratio of aluminium diethyl-chloride to $TiCl_4$ of 0.8, over a period of several hours, the temperature being held at 0° C. The precipitate containing $TiCl_3$ thus formed was separated, washed with more of the hydrocarbon fraction and subjected to a heat treatment for four hours at 85° C. It was introduced into the polymerisation vessels in the form of a slurry with a small quantity of the hydrocarbon fraction.

EXAMPLE 1

A litre flask was carefully dried an purged of air by passing in nitrogen. In it were placed 400 mls. 4-methyl pentene-1 and 50 mls. of pentene-1, together with 10 millimoles aluminium diethylchloride and 3 millimoles trichloride. The mixture was stirred and held at 10° C. for 50 minutes, while polymerisation took place. Polymerisation was then stopped by the addition to the reaction mixture of 25 mls. acetylacetone (distilled and dried over sodium sulphate) and 400 mls. dry isopropyl alcohol. The resulting slurry was stirred for one hour at 20° C., the polymer was filtered off under nitrogen and washed with further amounts of acetylacetone and isopropyl alcohol. 6.6 grams of a fine white powder were isolated. A sample of this was compression moulded at 265° C. for five minutes under a pressure of 20 tons/sq. inch, removed from the press and promptly quenched in water to give a flexible ⅛₆″ plaque showing light transmission of 94%. The polymer obtained was well crystalline, and had a pentene-1 content determined by infra-red analysis of 28% by weight, clarity of Grade IV and haze of Group 4.

EXAMPLE 2

In a flask prepared as in Example 1 were placed 400 mls. 4-methyl pentene-1 and 40 mls. hexene-1. The catalyst components used in Example 1 were added. Polymerisation took place at 15° C. for half an hour. A good slurry formed. Reaction was then stopped by adding 15 mls. dry acetylacetone and 400 mls. dry isopropyl alcohol. The mixture was stirred for one hour at 20° C.; the polymer was then separated and washed with further quantities of isopropyl alcohol in a heated sinter vessel at 56° C. 6.5 grams of a fine white powder were recovered. A sample of this was compression moulded under the same conditions as in Example 1 to an ⅛″ plaque having clarity of Grade IV and haze of Group 4. The moulding was crystalline and flexible. The copolymer contained 24% by weight of hexene-1, as determined by infra-red analysis. Similar experiments were made using octene-1 and octadecene-1 in place of hexene-1. In both cases transparent copolymer of high clarity and low haze was obtained.

EXAMPLE 3

A litre flask was carefully dried and purged of air by passing in nitrogen. In it were placed 400 mls. 4-methyl pentene-1, 15 mls. pentene-1 and 15 mls. hexene-1 together with 10 millimoles aluminium diethyl chloride and 3 millimoles titanium trichloride. The mixture was stirred and held at 15° C. for 85 minutes; a good slurry resulted. Polymerisation was stopped by the addition to the reaction mixture of 25 mls. acetylacetone (distilled and dried over sodium sulphate) and 400 mls. dry isopropyl alcohol. The resulting slurry was stirred for one hour at 25° C., the polymer filtered off under nitrogen and washed with more acetylacetone and isopropyl alcohol mixture. Eight grams of a fine white powder were recovered. A sample of this was compression moulded at 265° C. for five minutes under a pressure of 20 tons/sq. inch in a 1 x 1 x 1/16" preform; the moulding was quenched in water on removal from the press. The light transmission of the plaque thus obtained was over 90%. The clarity of the copolymer was Grade IV and haze of Group 4, the 4-methyl pentene-1 content was between 80 to 90% by weight.

EXAMPLE 4

In a flask prepared as in Example 1 were placed 400 mls. of an impure 4-methyl pentene-1 feed stock containing about 5% hexene-1 and small quantities of other hexenes. Twenty mls. of octene-1 were added and polymerisation was conducted as in Example 3 for one hour at a temperature of 10° C. The polymer slurry was worked up and a sample of the copolymer isolated was moulded as described in Example 1. The plaque thus obtained showed 87% transmission; the copolymer had clarity of Grade IV and haze of Group 4.

EXAMPLE 5

A flask was carefully dried and freed of oxygen by passing nitrogen through it. In it were placed 250 mls. of a high-boiling petrol fraction, 42 ml. of a mixture of 4-methyl pentene-1 with octene containing 10% by volume of octene-1, 12 millimoles aluminium diethyl-chloride and 4 millimoles $TiCl_3$ (prepared by the reduction of $TiCl_4$ with aluminium ethyl sesquichloride as described for Example 1). The temperature of the flask was maintained at 50° C.; polymerisation started immediately. Throughout polymerisation, which continued for two hours, further amounts of the 4-methyl pentene-1/octene-1 mixture were fed at the rate of 37.5 mls./hr. Although the polymerisation medium became thick, a good slurry formed. The catalyst was destroyed by adding 50 mls. dry isopropyl alcohol, and removed from the polymer by careful washing with dry isopropyl alcohol/acetylacetone solution. 54 g. of copolymer were obtained, containing 12% by weight of octene-1 monomer units according to infra-red measurements. Compression mouldings of the copolymer showed clarity of Grade IV, haze of Group 4 and light transmission of over 80%.

Repeating this example using a 7.5% solution instead of a 10% solution of octene-1 in 4-methyl pentene gave 51 g. of a copolymer containing 8.1% of octene-1 by weight. The compression moulding had similar optical properties.

EXAMPLE 6

A dry oxygen-free flask was prepared; in it were placed 1.5 litres of a high-boiling paraffin fraction, 252 mls. of a 10% solution of hexene-1 in 4-methyl pentene-1, 18 millimoles titanium trichloride (prepared by the reduction of $TiCl_4$ as for Example 1). Polymerisation started immediately. The temperature was maintained at 50° C. for two hours. 18.75 mls. of the 10% hexene/4-methyl pentene solution were fed to the reaction every five minutes. The catalyst was then destroyed with 55 mls. dry acetylacetone and 110 mls. isopropyl alcohol. The polymer was then de-ashed with dry isopropyl alcohol at 50° C., dried and stored under nitrogen. Compression mouldings of the polymer had excellent optical properties. It was shown by infra-red analysis to contain 13% by weight hexene-1 monomer units. The ash content was less than 0.01%; Ti less than 10 p.p.m., Al less than 10 p.p.m., melting point 229° C.

The example was repeated using a 7.5% solution of hexene-1 in 4-methyl pentene-1. The product contained 9% by weight of hexene-1, had excellent optical properties and a melting point of 233° C.

A further repetition using a 5% solution of hexene-1 in 4-methyl pentene-1 produced a copolymer containing 6% by weight of hexene-1, with a melting point of 235° C.

EXAMPLE 7

A flask was carefully dried and freed of oxygen. In it were placed 500 mls. of a high-boiling paraffin fraction, 75 mls. of a solution of 4-methyl pentene-1 containing 5% by volume of hexene-1 and 5% by volume of octene-1, 18 millimoles aluminium diethyl chloride and 6 millimoles $TiCl_3$ (prepared as for Example 1). Polymerisation started at once and was continued for two hours at a temperature of 50° C. Throughout this period a solution of 5% by volume hexene and 75% by volume octene-1 in 4-methyl pentene-1 was added at the rate of 60 mls./hour (2 mls. every 2 minutes). At the end of the period addition was stopped but the polymerisation was allowed to continue for a further three hours. The catalyst was then destroyed by addition of 20 mls. dry acetylacetone and 80 mls. dry isopropyl alcohol, followed by a further 220 mls. dry isopropyl alcohol. The mixture was allowed to stand overnight and the copolymer was then de-ashed by washing with dry isopropyl alcohol at 50° C. 94. grams copolymer were obtained. Infra-red analysis: 6% by weight hexene-1 monomer units; 8% by weight octene-1 monomer units. Ash 0.02%, Ti <10 p.p.m., Al <10 p.p.m. An 1/8" compression moulding made at a temperature of 265° C. and quenched showed clarity of Grade IV, haze of Group 4 and transmission of 77%. Repeating the experiment using lesser quantities of hexene-1 and octene-1 gave copolymer containing 5% hexene and 4% octene, and showing 91% transmission.

EXAMPLES 8–19

Copolymers of pentene-1, hexene-1, octene-1 and decene-1 with 4-methyl pentene-1 were made by the methods of Examples 1–7. The materials obtained were moulded without stabiliser into 1/8" plaques by compression using a pressure of 20 tons/sq. inch for five minutes, using a variety of temperatures and cooling conditions. The optical properties of the resulting plaques are shown in Tables 1–4. Mechanical properties of the materials obtained are shown in Table 5.

In Table 5, $T(m)$ is the crystalline melting point of the polymer, measured using a polarising microscope. $T(g)$ is the glass transition point (100 c.p.s.). Crystallinity was measured by X-rays on annealed powder. Melt flow index was measured on powder containing 1% stabiliser at 260° C., using a 5 kg. weight. Impact strength was measured at 0° C. by the flexural method, using a speed of 96 inch/second. The ratio of the brittle strength at −180° C. and the flexural yield stress at +20° C. is a measure of the toughness of the polymer.

EXAMPLE 20

A flask was carefully dried and purged of oxygen by passing nitrogen through it. In it were placed 200 mls. 4-methyl pentene-1, 5 mls. octadecene-1; 3 millimoles $TiCl_3$ (prepared as for Example 1) and 10 millimoles aluminium diethyl chloride. Polymerisation took place for half an hour; then the catalyst was killed with a dry acetylacetone/isopropanol mixture, and washed out of the polymer with further quantities of dry isopropanol. The copolymer obtained had an octadecene-1 content of 3.1%. It showed clarity of Grade IV and haze of Group 4. A 1/8" quenched compression moulding showed 80.5% transmission.

The above experiment was repeated, using 10, 15, 20 and 25 ml. amounts of octadecene-1. The copolymers obtained had octadecene-1 contents of 3.9, 6.3, 8.7 and 12.0% by weight and transmissions in 1/16" section of 85, 89, 78 and 58%, respectively.

TABLE 1

| Example | Percent Pentene | Moulding Temperature, °C. | Moulding Conditions | Percent Light Transmission | Percent Haze | Clarity | Spherulite Size (μ) | | |
|---|---|---|---|---|---|---|---|---|---|
| | | | | | | | Maximum | Mean | Minimum |
| 8 | 11 | 260 | Quenched | 94.5 | 0.8 | IV | 70 | 28 | 7 |
| | | 280 | | 91.0 | 0.2 | IV | 84 | 42 | 21 |
| | | 300 | | 91.0 | 0.5 | IV | 56 | 35 | 21 |
| | | 260 | Cooled in press | 75 | 2.7 | III-IV | 56 | 35 | 28 |
| | | 280 | | 54 | 3.2 | IV | 70 | 35 | 35 |
| | | 300 | | 58 | 2.8 | III-IV | 91 | 56 | <7 |
| 9 | 7 | 260 | Quenched | 93.5 | 0.9 | IV | 70 | 56 | <7 |
| | | 280 | | 92 | 0.8 | IV | 140 | 84 | 14 |
| | | 300 | | 87.5 | 0.6 | IV | 70 | 49 | 35 |
| | | 260 | Cooled in Press | 71 | 4.5 | III-IV | 70 | 35 | 14 |
| | | 280 | | 60 | 3.6 | IV | 120 | 70 | 14 |
| | | 300 | | 52.5 | 4.0 | III-IV | 105 | 56 | 35 |
| 10 | 15 | 260 | Quenched | 93.0 | 0.6 | IV | 35 | 21 | 14 |
| | | 280 | | 95.0 | 0.3 | IV | 70 | 56 | 35 |
| | | 300 | | 93.0 | 1.2 | IV | 56 | 35 | 21 |
| | | 260 | Cooled in Press | 86.5 | 1.8 | IV | 42 | 28 | 21 |
| | | 280 | | 77.5 | 1.1 | IV | 105 | 70 | 35 |
| | | 300 | | 79.0 | 1.4 | IV | 70 | 35 | 21 |

*ASTM Test No. D-1746-62T.

TABLE 2

| Example | Percent Hexene | Moulding Temperature, °C. | Moulding Conditions | Percent Light Transmission | Percent Haze | Clarity | Spherulite Size (μ) | | |
|---|---|---|---|---|---|---|---|---|---|
| | | | | | | | Maximum | Mean | Minimum |
| 11 | 18 | 260 | Quenched | 94 | 0.7 | IV | 70 | 56 | 14 |
| | | 280 | | 98 | 0.6 | IV | 77 | 70 | 35 |
| | | 300 | | 93 | 0.5 | IV | 140 | 105 | 28 |
| | | 260 | Cooled in Press | 89 | 1.4 | IV | 70 | 56 | 7 |
| | | 280 | | 79 | 1.6 | IV | 105 | 70 | 14 |
| | | 300 | | 78 | 1.7 | IV | 140 | 91 | 35 |
| 12 | 13 | 260 | Quenched | 95.5 | 1.0 | IV | 56 | 49 | 35 |
| | | 280 | | 86 | 1.0 | IV | 126 | 105 | 35 |
| | | 300 | | 87 | 0.9 | IV | 70 | 42 | 35 |
| | | 260 | Cooled in Press | 76.5 | 4.3 | III-IV | 56 | 35 | 21 |
| | | 280 | | 70 | 3.0 | IV | 49 | 42 | 28 |
| | | 300 | | 66 | 2.9 | III-IV | 70 | 56 | 42 |
| 13 | 9 | 260 | Quenched | 89 | 1.4 | IV | 140 | 105 | 70 |
| | | 280 | | 89 | 1.0 | IV | 140 | 70 | 35 |
| | | 300 | | 83 | 0.8 | IV | 175 | 105 | 21 |
| | | 260 | Cooled in Press | 80 | 3.4 | IV | 49 | 35 | 21 |
| | | 280 | | 62 | 3.6 | III-IV | 70 | 49 | 24 |
| | | 300 | | 54 | 3.5 | III-IV | 70 | 42 | 14 |

TABLE 3

| Example | Percent Octene | Moulding Temperature, °C. | Moulding Conditions | Percent Light Transmission | Percent Haze | Clarity | Spherulite Size (μ) | | |
|---|---|---|---|---|---|---|---|---|---|
| | | | | | | | Maximum | Mean | Minimum |
| 14 | 11.8 | 260 | Quenched | 91 | 1.5 | II | 70 | 35 | 21 |
| | | 280 | | 93 | 2.8 | IV | 70 | 63 | <2 |
| | | 280 | | 96 | 1.5 | IV | 70 | 35 | 14 |
| | | 260 | Cooled in Press | 84 | 4.5 | IV | 35 | 21 | 7 |
| | | 280 | | 88 | 21. | IV | 80 | 35 | 21 |
| | | 300 | | 85 | 2.5 | IV | 85 | 42 | 21 |
| 15 | 10.7 | 260 | Quenched | 90 | 1.6 | IV | 70 | 55 | 35 |
| | | 280 | | 90 | 1.4 | IV | 122 | 70 | 35 |
| | | 300 | | 88 | 1.8 | IV | 70 | 55 | 14 |
| | | 260 | Cooled in Press | 85 | 3.1 | IV | 35 | 30 | 7 |
| | | 280 | | 84.5 | 2.3 | III-IV | 11 | 50 | 35 |
| | | 300 | | 83.0 | 1.4 | III-IV | 100 | 35 | 30 |
| 16 | 7.2 | 260 | Quenched | 87 | 1.3 | IV | 140 | 105 | 70 |
| | | 280 | | 88 | 1.2 | IV | 105 | 70 | 56 |
| | | 300 | | 86.5 | 1.5 | IV | 140 | 70 | 35 |
| | | 260 | Cooled in Press | 83 | 3.4 | III-IV | 105 | 85 | 35 |
| | | 280 | | 78 | 3.7 | III-IV | 98 | 55 | 20 |
| | | 300 | | 69 | 2.7 | III-IV | 105 | 91 | 56 |
| 17 | 4.0 | 260 | Quenched | 91 | 1.1 | IV | 105 | 105 | 70 |
| | | 280 | | 91 | 1.6 | IV | 105 | 55 | 40 |
| | | 300 | | 89 | 1.6 | IV | 100 | 70 | 56 |
| | | 260 | Cooled in Press | 76.5 | 5.9 | IV | 70 | 40 | 7 |
| | | 280 | | 78.5 | 4.5 | III-IV | 70 | 20 | 7 |
| | | 300 | | 54 | 3.5 | III | 110 | 70 | 35 |

TABLE 4

| Example | Percent Decene | Moulding Temperature, °C. | Moulding Conditions | Percent Light Transmission | Percent Haze | Clarity | Spherulite Size (μ) | | |
|---|---|---|---|---|---|---|---|---|---|
| | | | | | | | Maximum | Mean | Minimum |
| 18 | 4.8 | 260 | Quenched | 93 | 1.2 | IV | | | |
| | | 280 | | 93 | 1.6 | IV | 105 | 35 | 14 |
| | | 300 | | 90 | 1.9 | IV | 105 | 70 | 35 |
| | | 260 | Cooled in Press | 77 | | IV | 35 | 15 | 14 |
| | | 280 | | 79 | | III-IV | 56 | 35 | 15 |
| | | 300 | | 81 | | III-IV | 56 | 35 | 10 |
| 19 | 8.4 | 260 | Quenched | 87 | 2.0 | III-IV | 70 | 55 | 14 |
| | | 280 | | 84 | 2.2 | IV | 42 | 35 | 15 |
| | | 300 | | 81 | 2.2 | III-IV | 40 | 35 | 14 |
| | | 260 | Cooled in Press | | | IV | 50 | 40 | 7 |
| | | 280 | | | | IV | 140 | 70 | 20 |
| | | 300 | | | | III | 140 | 60 | 30 |

TABLE 5

| Example | Comonomer | Percent Comonomer | Tm (°C.) | Tg (°C.) | Crystallinity, percent | M.F.I. | Impact Strength, foot-lb. | Brittle Strength (-180° C.) | Flexural Yield Stress (20° C.) (p.s.i. ×10⁻³) | Bending Modulus (20° C.), dynes/cm.² (×10¹⁰) | Tear Strength, lb./inch |
|---|---|---|---|---|---|---|---|---|---|---|---|
| 8 | Pentene-1 | 11 | 235 | | 57 | 0.059 | 0.17 | 15.3 | 6.5 | | 43 |
| 9 | do | 7 | 240 | | 58 | 0.069 | 0.13 | 14.8 | 7.3 | 0.95 | |
| 10 | do | 15 | 232 | 49 | 57 | 0.068 | 0.23 | | 6.2 | 0.6 | 57 |
| 11 | Hexene-1 | 18 | 229 | 42 | 55 | 0.124 | 0.13 | 15.8 | 4.8 | 0.34 | 62 |
| 12 | do | 13 | 233 | | 54.5 | 0.099 | 0.16 | 15.9 | 6.5 | 0.61 | 73 |
| 13 | do | 9 | 235 | | 62 | 0.079 | 0.18 | 17.2 | 7.5 | 0.93 | 56 |
| 14 | Octene-1 | 11.8 | 230 | 34 | 46 | 0.126 | Tough | 16.5 | 4.0 | 0.23 | 78 |
| 15 | do | 10.7 | 230 | | 46.5 | 0.152 | Tough | 18.4 | 4.1 | 0.2 | 113 |
| 16 | do | 7.2 | 230 | | 54 | 0.061 | 0.17 | 18.8 | 8.1 | 0.65 | 33 |
| 17 | do | 4.0 | 232 | | 58 | 0.041 | 0.15 | 18.9 | 8.8 | .96 | 48 |
| 18 | Decene-1 | 4.8 | 232 | 42 | 43 | 0.083 | 0.12 | 20.9 | 6.5 | 0.5 | 68 |
| 19 | do | 8.4 | 229 | | 42 | 0.093 | Tough | 20.8 | 5.2 | 0.34 | 81 |
| Homopolymer of 4-methyl pentene-1 | | | 245 | 57-60 | 65 | <1 | | 20.1 | 10.9 | 1.6 | 21 |

We claim:
1. A solid transparent copolymer of 4-methyl pentene-1 with from about 0.5 to about 30% by weight of a linear 1-olefine having from 5 to 18 carbon atoms, said copolymer having an ash content of less than 0.1% by weight.

2. A solid transparent copolymer of 4-methyl pentene-1 with from about 0.5 to about 20% by weight of pentene-1 or hexene-1, said copolymer having an ash content of less than 0.1% by weight.

3. A copolymer as claimed in claim 1 being capable of melt shaping into articles having in ⅛" section clarity of Grade II.

4. A copolymer as claimed in claim 1 being capable of melt shaping into articles having in ⅛" section clarity of Grade III.

5. A copolymer as claimed in claim 1 being capable of melt shaping into articles having in ⅛" section clarity of Grade IV.

6. A copolymer as claimed in claim 1 being capable of melt shaping into articles having in ⅛" section haze of Group 2.

7. A copolymer as claimed in claim 1 being capable of melt shaping into articles having in ⅛" section haze of Group 3.

8. A copolymer as claimed in claim 1 being capable of melt shaping into articles having in ⅛" section haze of Group 4.

9. A copolymer as claimed in claim 2 being capable of melt shaping into articles having in ⅛" section clarity of Grade IV and haze of Group 4.

10. A transparent article comprising a copolymer claimed in claim 1.

11. A transparent article comprising a copolymer claimed in claim 3.

12. A process for the manufacture of a solid transparent which consists essentially of a trivalent titanium halide activated by an aluminum alkyl halide, copolymer of 4-methyl pentene-1 with minor amounts of a linear 1-olefine having from 5 to 18 carbon atoms according to claim 1 wherein 4-methyl pentene-1 and a linear 1-olefine having from 5 to 18 carbon atoms are polymerised in the presence of a stereospecific catalyst (as hereinbefore defined) and the copolymer obtained is de-ashed using dry reagents to reduce its ash content to less than 0.1% by weight.

13. A process as claimed in claim 12 wherein the ash content of the copolymer is reduced to less than 0.02% by weight.

14. A process as claimed in claim 12 wherein the trivalent titanium halide is obtained by the reduction of titanium tetrachloride with an aluminum alkyl compound.

15. A process as claimed in claim 14 wherein the reduction of the titanium tetrachloride is carried out in a hydrocarbon medium at about 0° C. by adding aluminium alkyl sesquichloride thereto gradually over a period.

16. A process as claimed in claim 12 wherein the temperature of polymerisation is between 10 and 80° C.

17. A process as claimed in claim 12 wherein as de-ashing reagent is used an alcohol, or a mixture of an alcohol and acetylacetone.

18. A process as claimed in claim 17 wherein the alcohol is methanol, ethanol, isopropanol, butanol or nonanol.

19. A process as claimed in claim 12 wherein the linear 1-olefine is pentene-1 or hexene-1.

20. A process as claimed in claim 12 wherein a mixture of linear 1-olefines is copolymerised.

21. A process for preparing an article as claimed in claim 10, said process comprising preparing a solid transparent (as hereinbefore defined) copolymer of 4-methyl pentene-1 by polymerizing 4-methyl pentene-1 and from 0.5 to about 30% by weight, based on the weight of said 4-methyl pentene-1, of a linear 1-olefin having from 5 to 18 carbon atoms in the presence of a stereo-specific catalyst which consists essentially of a trivalent titanium halide activated by an aluminum alkyl halide, subsequently de-ashing the copolymer obtained with the use of dry reagents to reduce the ash content of said copolymer to less than 0.1% by weight, and thereafter subjecting the copolymer to a melt shaping process.

22. A flexible packaging container made from a polymer as claimed in claim 1 containing between 8 and 30% by weight of monomer units of a linear α-olefine having from 5 to 18 carbon atoms.

References Cited

UNITED STATES PATENTS

| | | | |
|---|---|---|---|
| 3,380,985 | 4/1968 | Edwards | 260—94.9 |
| 3,332,920 | 7/1967 | Clark et al. | 260—88.2 |

FOREIGN PATENTS

| | | |
|---|---|---|
| 849,090 | 9/1960 | Great Britain. |

JOSEPH L. SCHOFER, Primary Examiner

ROGER S. BENJAMIN, Assistant Examiner

U.S. Cl. X.R.

260—875